(12) United States Patent
Smith

(10) Patent No.: US 8,276,992 B2
(45) Date of Patent: Oct. 2, 2012

(54) REMOVABLE WHEEL COVER

(76) Inventor: Greg Smith, Sunderland (CA)

( * ) Notice: Subject to any disclaimer, the term of this patent is extended or adjusted under 35 U.S.C. 154(b) by 0 days.

(21) Appl. No.: 12/768,861

(22) Filed: Apr. 28, 2010

(65) Prior Publication Data

US 2010/0270853 A1  Oct. 28, 2010

(51) Int. Cl.
*B60B 7/04* (2006.01)
*B60B 7/06* (2006.01)

(52) U.S. Cl. ........... 301/37.376; 301/37.34; 301/37.102; 301/37.106; 301/37.109; 301/37.31

(58) Field of Classification Search ............ 301/37.101, 301/37.26, 37.28, 37.102, 37.31, 37.32, 37.33, 301/37.34, 37.106, 37.107, 37.109, 37.372, 301/37.374, 37.375, 37.376
See application file for complete search history.

(56) References Cited

U.S. PATENT DOCUMENTS

| | | | | |
|---|---|---|---|---|
| 2,031,355 A | * | 2/1936 | Zerk | 301/37.105 |
| 2,518,809 A | * | 8/1950 | Neidhart-Locher | 152/25 |
| 3,356,421 A | * | 12/1967 | Trevarrow, Jr. | 301/37.42 |
| 4,593,953 A | | 6/1986 | Baba et al. | |
| 6,443,528 B1 | | 9/2002 | Polka | |
| 6,502,308 B1 | | 1/2003 | Carfora et al. | |
| 6,575,537 B1 | * | 6/2003 | Wang | 301/37.23 |
| 6,682,150 B1 | | 1/2004 | Chen | |
| 6,688,703 B1 | * | 2/2004 | Wang | 301/37.23 |
| 6,726,290 B1 | * | 4/2004 | Yue | 301/37.23 |
| 6,755,484 B2 | | 6/2004 | Wallach | |
| 6,789,854 B2 | | 9/2004 | Wang | |
| 6,860,568 B2 | * | 3/2005 | Nunes | 301/37.23 |
| 6,932,434 B2 | | 8/2005 | Wang | |
| 6,945,609 B2 | * | 9/2005 | Barney | 301/37.25 |
| 2004/0145236 A1 | | 7/2004 | Wang | |

\* cited by examiner

*Primary Examiner* — Kip T Kotter
(74) *Attorney, Agent, or Firm* — Norton Rose Canada LLP

(57) ABSTRACT

A universal wheel cover assembly for covering a variety of different vehicle's wheels. The universal wheel cover assembly comprises: (a) a covering disc sized to cover the vehicle's wheel, (b) a universal bolt pattern plate, the universal bolt pattern plate including (i) a series of sections, each of the sections having a plurality of engagement members, wherein the sections are adapted for matching a pattern of threaded rods welded on the vehicle's axle hub used for attaching the vehicle's wheel, and (ii) a retaining system for connecting the universal bolt pattern plate to the covering disc, and (c) a spring biasing base comprising of a plurality of coil units, each coil unit for coupling one bolt in the pattern of bolts to the engagement members of the universal bolt pattern plate. The removable wheel cover assembly may be used in a variety of different vehicle tire rims and is aesthetically pleasing.

16 Claims, 11 Drawing Sheets

Section A-A

Section B-B

Section C-C

REMOVABLE WHEEL COVER

FIELD OF THE INVENTION

This invention relates generally to wheel covers for covering a vehicle wheel and more particularly to a removal or universal wheel cover assembly for a variety of different vehicle tire wheels and yet more particularly to a removable or universal wheel cover assembly for a variety of different vehicle tire wheels that is aesthetically pleasing.

BACKGROUND OF THE INVENTION

Most vehicle wheel covers, wheel caps, hubcaps (hereinafter "wheel covers") for vehicles such as automobiles, recreation vehicles, and small trailers, are attached to the wheel by either clip-on retention, where some type of spring steel clip (or plastic clip in the case of plastic hubcaps) engages a groove in the wheel, or bolt-on retention, where a threaded fastener retains the hubcap, or a plastic washer attached to the lug nut itself holds the wheel cover on. While quite adequate for most applications, these attachments are often the source of irritating noise, are difficult to secure to a wheel and have a tendency of falling off.

Wheel covers in the market extend slightly past the perimeter of the rim by as much as 20%, no wheel cover currently in the market increases airflow to the brake system; no wheel cover currently in the market offers a variety of different colours; no wheel cover currently in the market offers a platform for advertising purposes.

Prior art mounting assemblies and hub covers that have been devised to address some of the noted issues include: U.S. Pat. Nos. 6,932,434; 6,789,854; 6,755,484; 6,682,150; 6,443,528 and 6,238,007.

The instant invention provides for a removable wheel cover assembly for covering wheel hubs in a variety of different vehicles and that overcome the limitations of the prior art.

SUMMARY OF THE INVENTION

The present invention provides for a universal wheel cover assembly.

In one aspect, a wheel cover assembly comprising a spring base, a bolt pattern plate, and a covering disc, is provided. The wheel cover assembly of the present invention can accommodate different styles and bolt patterns of wheels, as such the wheel cover assembly of the present application is a universal wheel cover assembly.

In another aspect the present invention provides for a universal wheel cover assembly for covering a vehicle's wheel, wherein said universal wheel cover assembly comprises: (a) a covering disc sized to cover the vehicle's wheel, (b) a universal bolt pattern plate, said universal bolt pattern plate including (i) a series of sections, each of said sections having a plurality of engagement means, wherein said sections are adapted for matching a pattern of threaded rods welded on the vehicle's axle hub used for attaching the vehicle's wheel, and (ii) a retaining system for connecting the universal bolt pattern plate to the covering disc, and (c) a spring biasing base comprising of a plurality of coil units, each coil unit for coupling one bolt in the pattern of bolts to the engagement means of the universal bolt pattern plate.

In another aspect the retaining system of the universal wheel cover assembly of the present invention comprises a plurality of holes on the universal bolt pattern plate that cooperate with mounting holes on the covering disc for bolted connection between the covering disc and the universal bolt pattern plate.

In another aspect the covering disc of the universal wheel cover assembly of the present invention includes a front side, a back side and a central well dropping from the front side to the back side, said central well having an open floor and an inner ring extending around said open floor, and wherein said retaining system connects the bolt pattern plate to the inner ring of the covering disc.

In another aspect the back side of the covering disc of the universal wheel cover assembly of the present invention includes plurality of supporting ribs extending from a periphery of said covering disc to the central well and a plurality of venting means disposed along said periphery of the covering disc, and wherein said supporting ribs are designed for directing air flow from the periphery of the covering disc to a braking system of the vehicle.

In another aspect of the present invention said universal wheel cover assembly further comprises an access cap, and wherein said central well is designed for receiving said access cap.

In another aspect of the present invention the access cap is capable of receiving one or more ornaments.

In another aspect, the covering disc is sized to cover said vehicle's wheel and up to about 50% of a tyre mounted to the vehicle's wheel.

In another aspect of the present invention the covering disc comprises a platform for advertisement purposes.

In another aspect of the present invention the bolt pattern plate includes from about 4 to about 6 sections for matching a vehicle's bolt pattern.

In another aspect of the present invention the plurality of engagement means comprises a plurality of slots capable of retaining the plurality of coil units to the universal bolt pattern plate.

In another aspect of the present invention the plurality of engagement means are capable of alignment to vehicle wheels having a variety of different patterns of holes.

In another aspect of the present invention each coil unit comprises a terminal portion adapted for connecting to the one spring holder and a proximal portion adapted for connecting to one engagement means.

In another aspect of the present invention terminal portion of each coil unit is capable of slipping through the spring holder's clearance slot and the spring holder is kept connected to the threaded rod with the use of a lug nut.

In another aspect of the present invention, the terminal portion of the coil unit is capable of connecting to the spring holder by twisting the coil unit thereby fastening the coil unit to the spring holder.

In another aspect of the present invention the proximal portion of each coil unit includes an opening capable of receiving a connecting means for connecting said coil unit to the engagement means.

In another aspect of the present invention the universal wheel cover assembly can be used to cover the wheel of automobiles, recreation vehicles, and trailers.

In another aspect the present invention provides for a universal covering wheel assembly kit, wherein said universal covering wheel assembly kit comprises: (a) a covering disc sized to cover the vehicle's wheel, (b) a universal bolt pattern plate, said universal bolt pattern plate including (i) a series of sections, each of said sections having a plurality of engagement means, wherein said sections are adapted for matching a pattern of bolts on the vehicle's axle hubs used for attaching the vehicle's wheel, and (ii) a retaining system for connecting the universal bolt pattern plate to the covering disc, and (d) a plurality of coil units, each coil unit for coupling one threaded rod welded on the vehicle's axle hubs to the engagement means of the universal bolt pattern plate.

In another aspect of the present invention the assembly kit further comprises an access cap.

Advantages of the wheel cover assembly of the present invention include:

1. A universal mounting assembly to accommodate a wide variety of vehicles and therefore tires. The rims and tires do not need to be upgraded to accommodate the wheel cover assembly of the instant invention.
2. A wheel cover that can extend out to cover up to 50% of the side wall of a tire.
3. Wheel covers that offer a large surface area that serve as a platform for advertising purposes. The user can also choose to include the logo of his/her favourite sports team, corporate logo, symbols that can be incorporated onto the wheel cover.
4. Wheel covers that include a special design that allows for increase air flow to the braking mechanism in a vehicle that can increase the brake life.
5. Wheel covers that come in a variety of colours. The user can choose wheel covers that can match the colour of a vehicle or complement the colour of the vehicle.
6. A wheel cover that is easy to assemble, clean and maintain.

BRIEF DESCRIPTION OF THE DRAWINGS

A detailed description of the present invention is provided herein below by way of example only and with reference to the following drawings, which.

Figure 1:
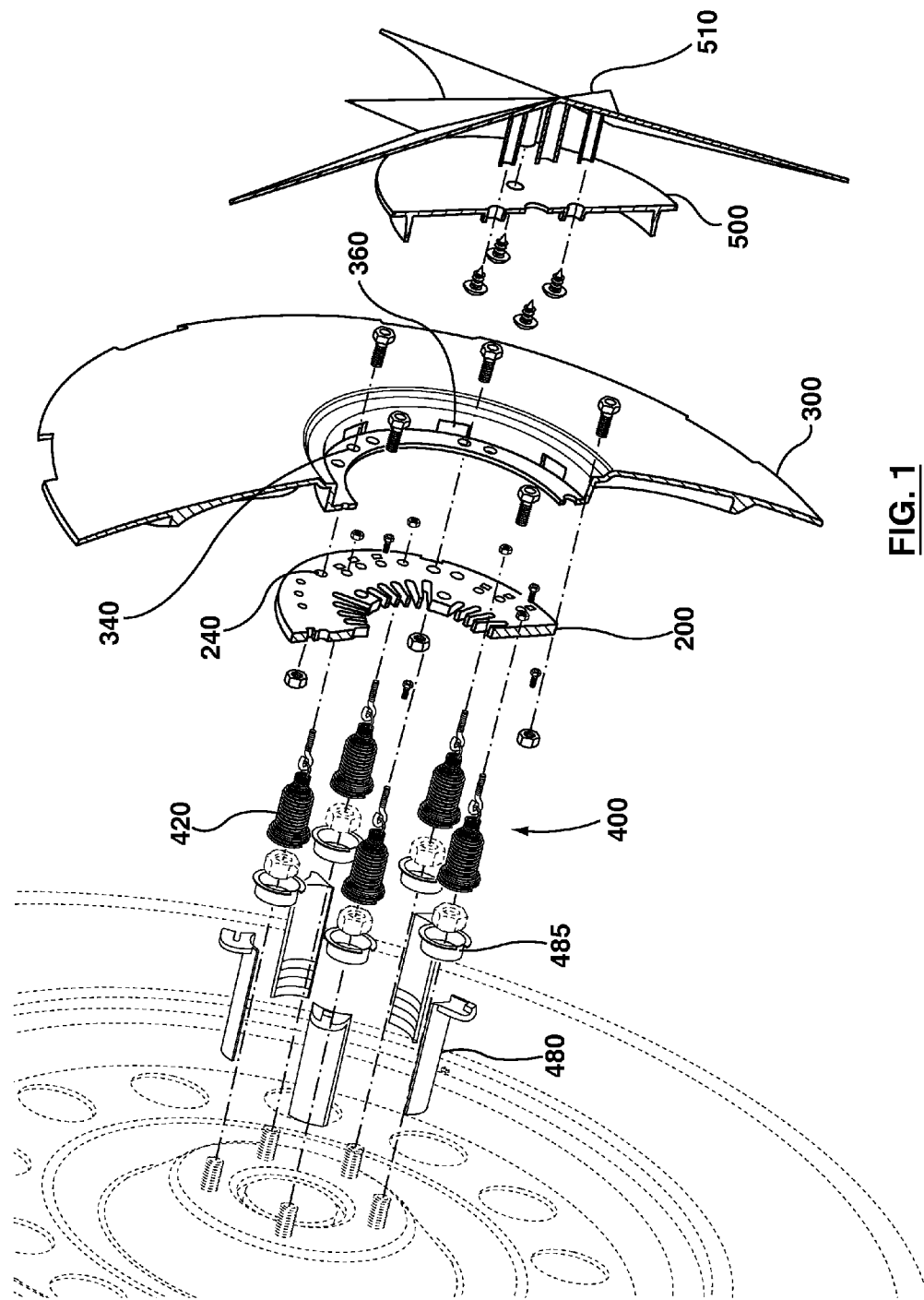
FIG. 1 illustrates a partial exploded, front side view of a removable wheel cover in accordance to one aspect of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

Unless defined otherwise, all technical and scientific terms used herein have the same meaning as commonly understood by one of ordinary skill in the art to which this invention belongs. Also, unless indicated otherwise, except within the claims, the use of "or" includes "and" and vice-versa. Non-limiting terms are not to be construed as limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise.

The wheel of a vehicle generally comprise of a central portion for fitting around the axle hub of the vehicle, and is retained to the vehicle's axle by a plurality of studs or bolts spaced apart around the axle hub, which can extend through a plurality of complementary holes in the wheel, and are retained in place by lug nuts. The number and disposition (i.e. the pattern) threaded rods around the axle hub vary among different vehicle models. The pattern of complementary clearance holes in the supplied wheel or rim of the tire match the pattern of threaded rods extending from the axle hub. In this document the number and disposition of the threaded rods around the axle hub is referred to as "bolt or threaded rod pattern" and the number and disposition of the complementary holes in the wheel is referred to as "wheel hole pattern."

Figure 2:
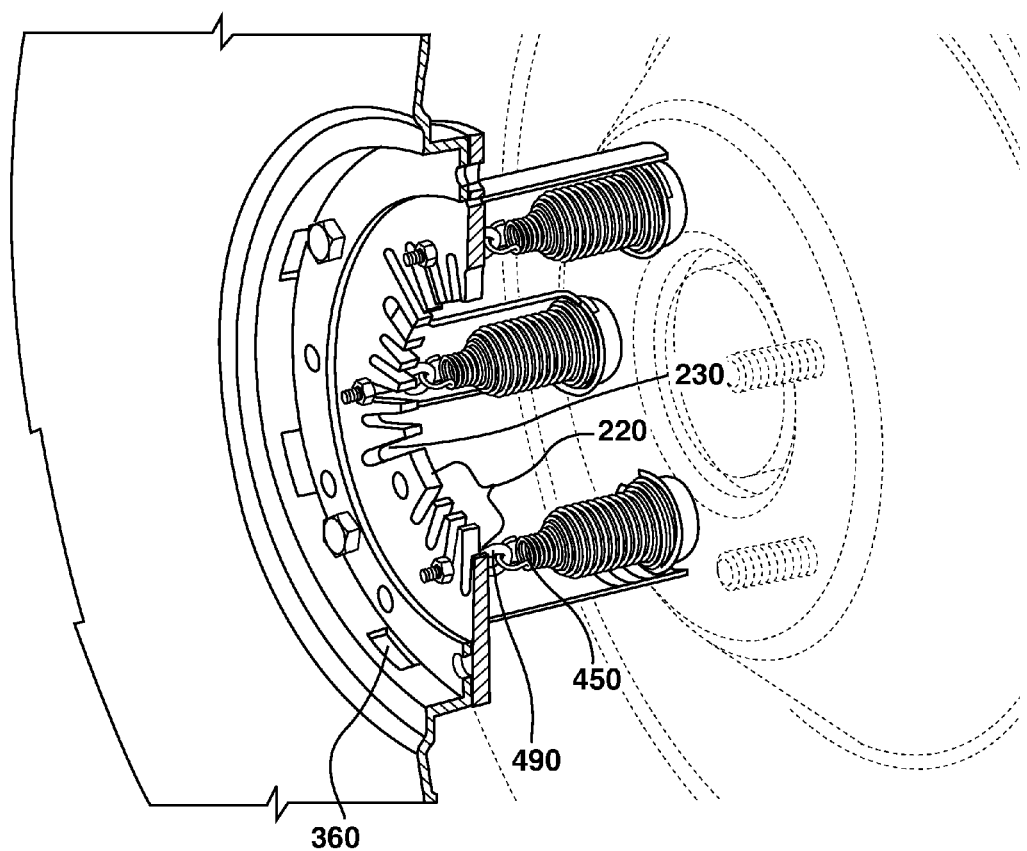
FIG. 2 illustrates a partial front side view of an assembled removable wheel cover assembly in accordance to one aspect of the present invention.
Figure 3:
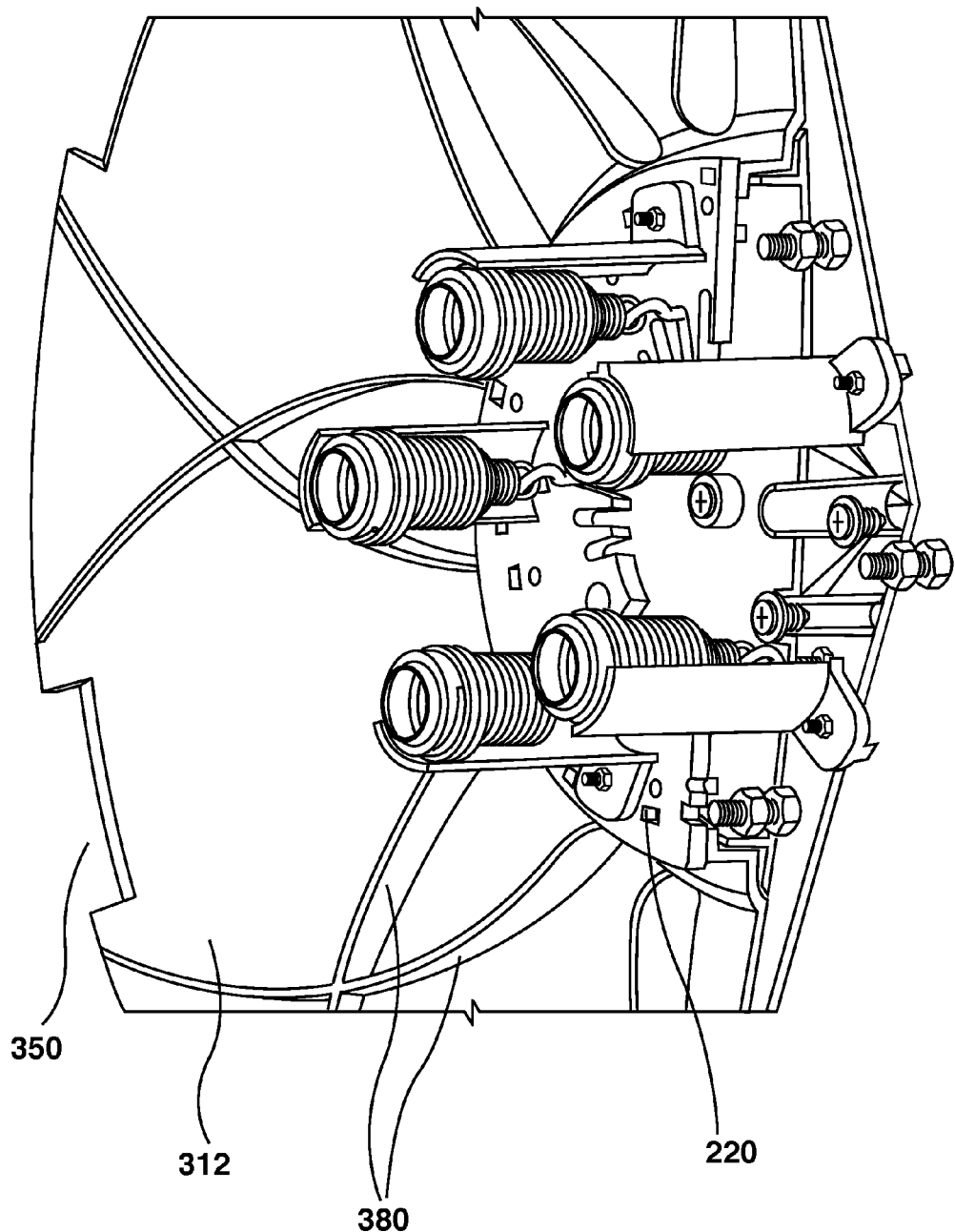
FIG. 3 illustrates a partial back side view of an assembled removable wheel cover assembly in accordance to one aspect of the present invention.
Figure 4:
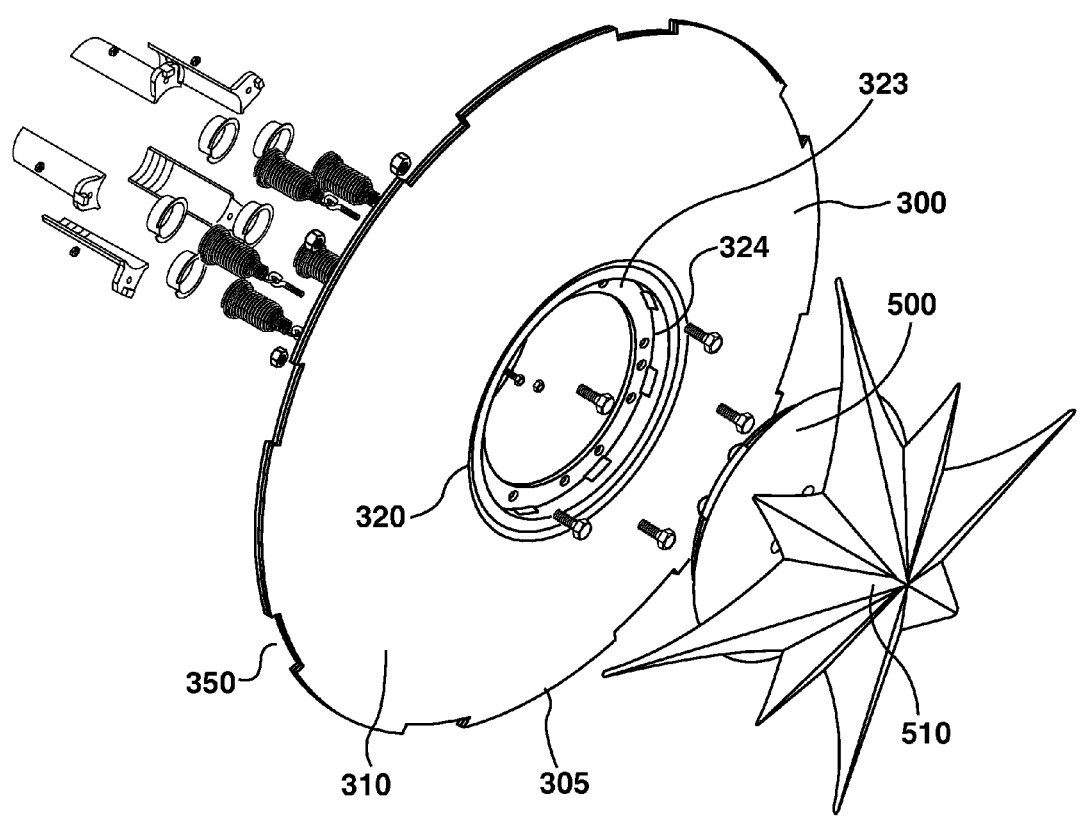
FIG. 4 is an exploded front side perspective view of a removable wheel cover assembly in accordance to one aspect of the present invention.
Figure 5:
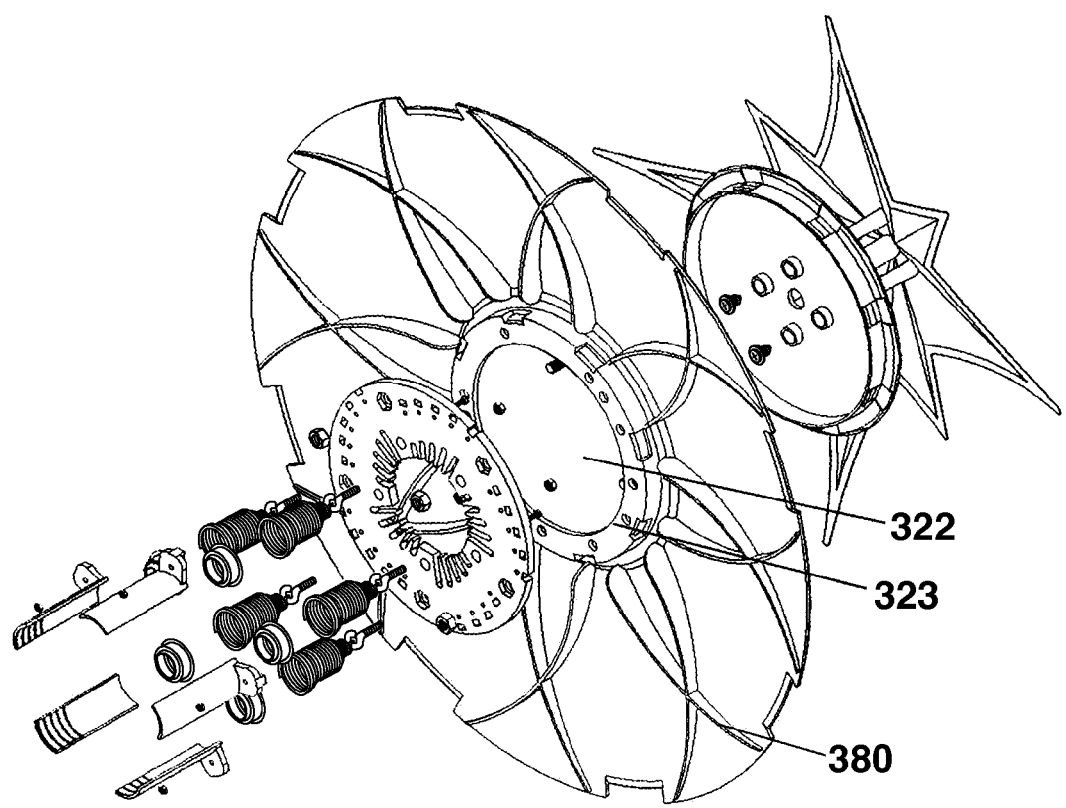
FIG. 5 is an exploded back side perspective view of a removable wheel cover assembly in accordance to one aspect of the present invention.
Figure 6:
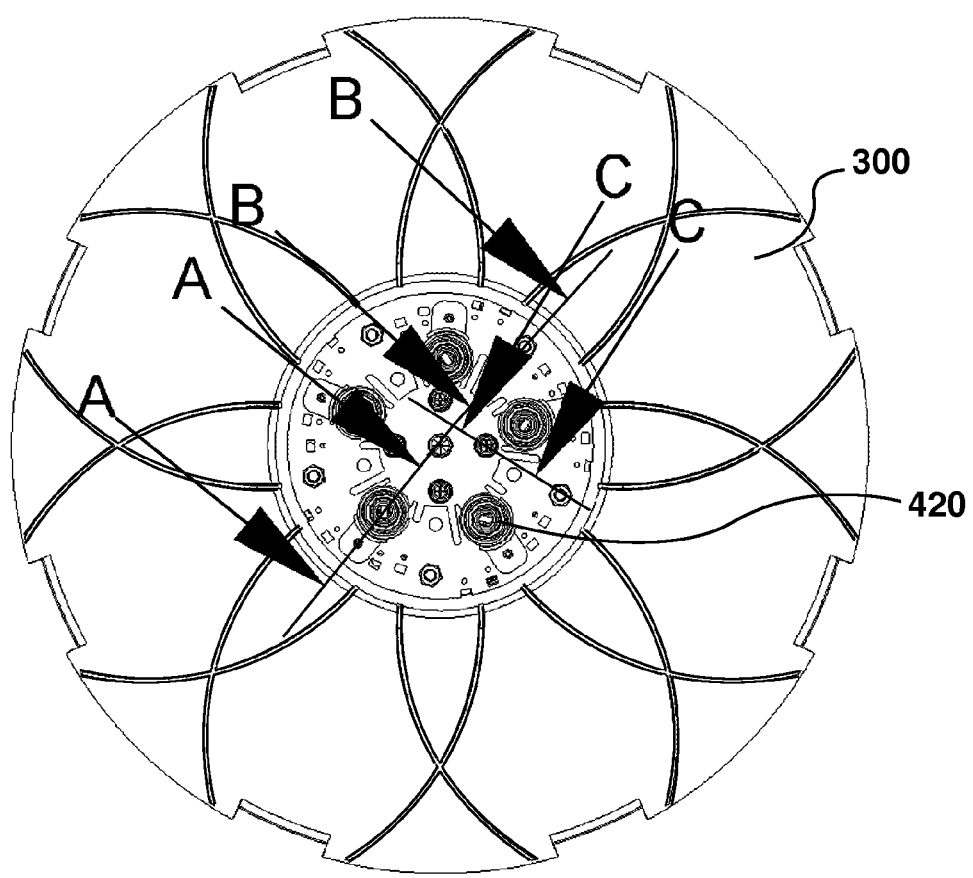
FIG. 6 illustrates a back side view of a removable wheel cover assembly in accordance to one aspect of the present invention.
Figure 7:
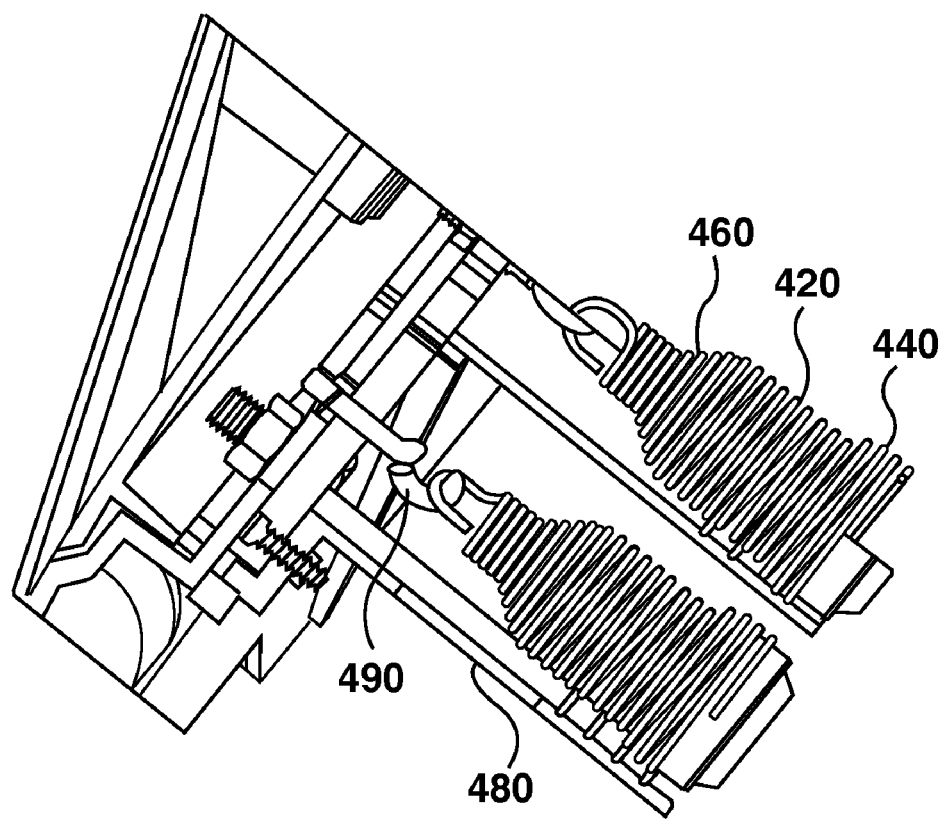
FIG. 7 illustrates a cross section of FIG. 3 between the arrows marked as A and A.
Figure 8:
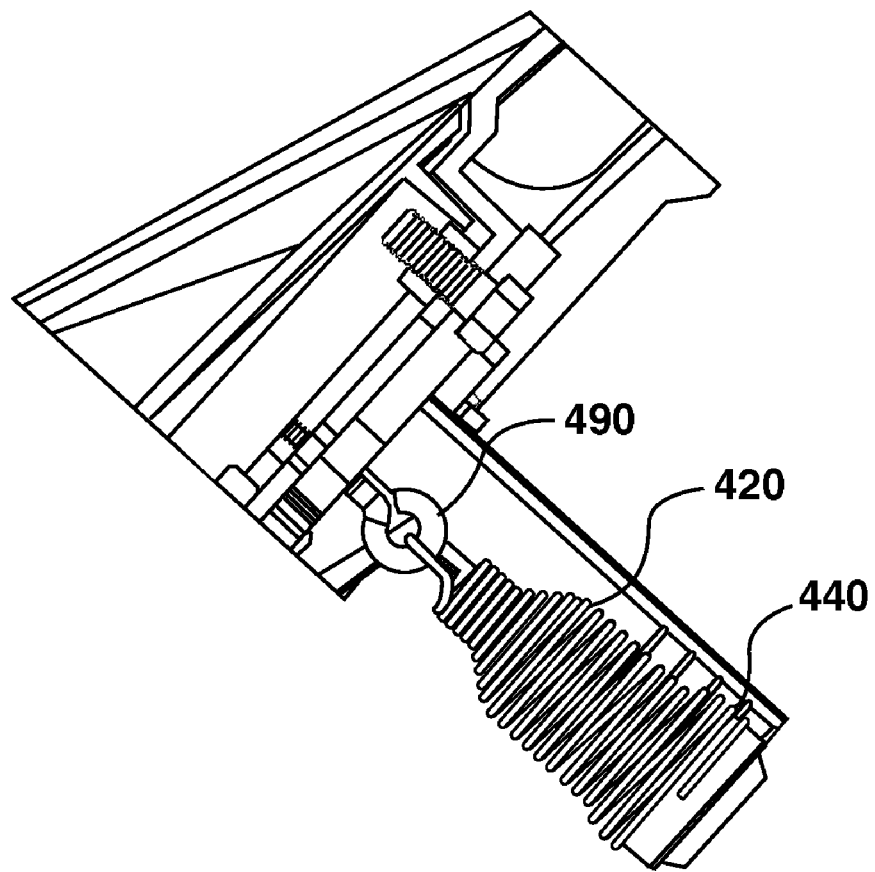
FIG. 8 illustrates a cross section of FIG. 3 between the arrows marked as B and B.
Figure 9:
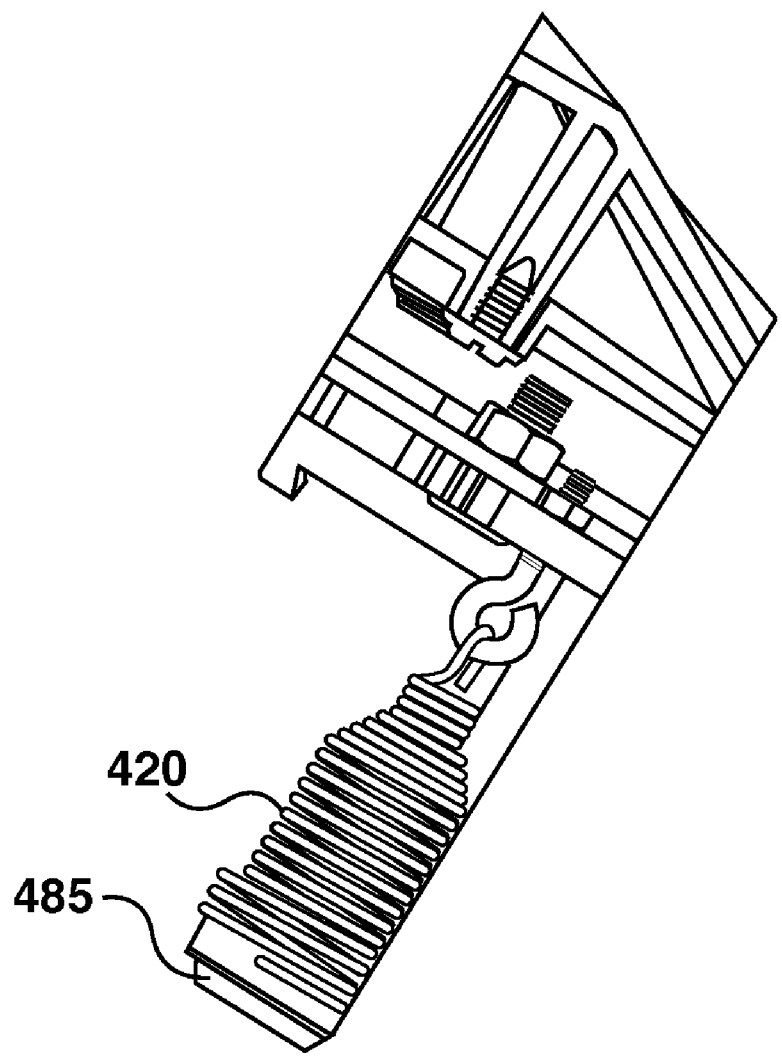
FIG. 9 illustrates a cross section of FIG. 3 between the arrows marked as C and C.
Figure 10:
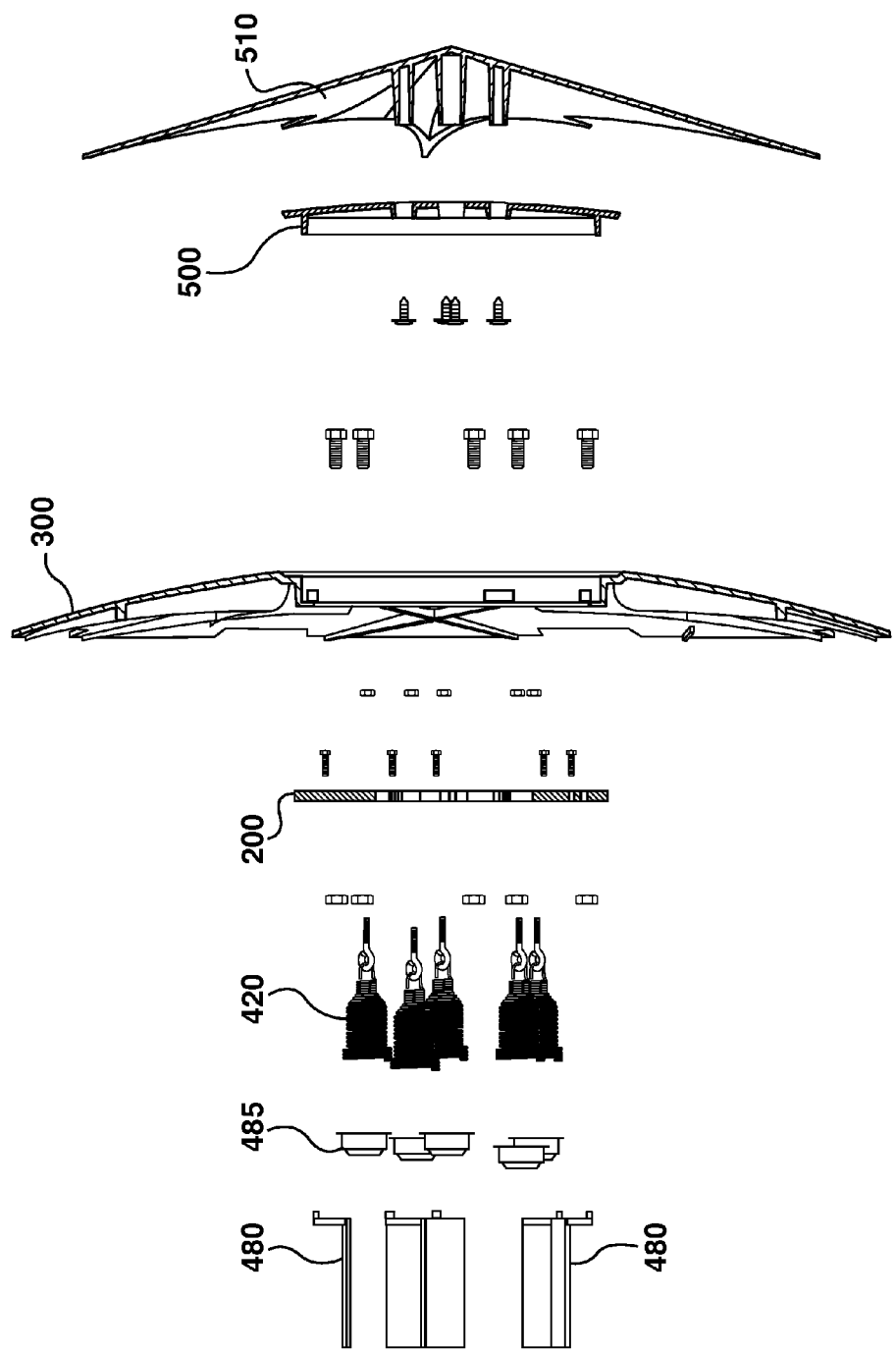
FIG. 10 illustrates a partial exploded, lateral side view of a removable wheel cover assembly in accordance to one aspect of the present invention.
Figure 11:
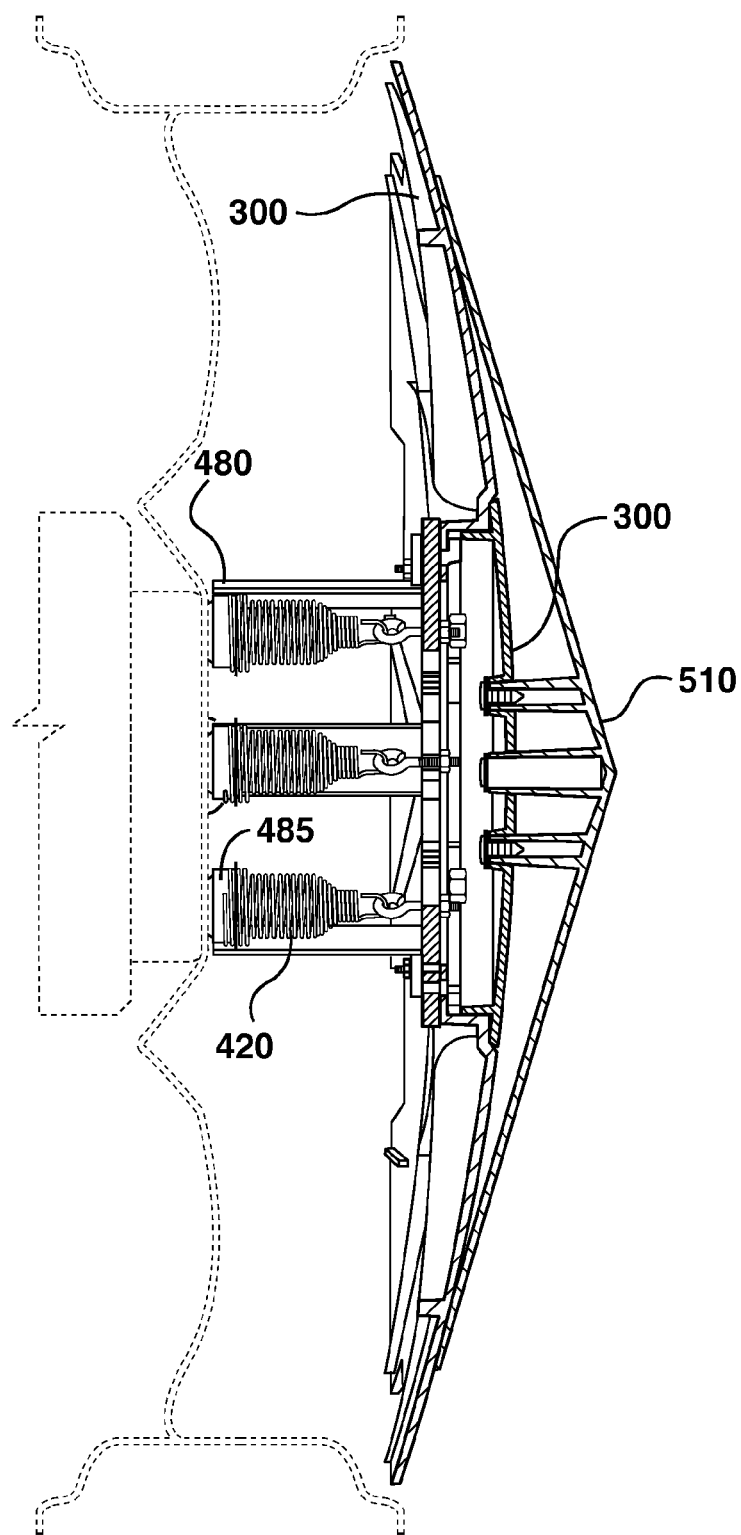
FIG. 11 illustrates a lateral side view of an assembled removable wheel cover assembly in accordance to one aspect of the present invention.

Referring to FIGS. 1 to 11, there is illustrated in perspective views, a wheel cover assembly of the present invention.

In one aspect, the present invention is a universal wheel cover assembly comprising a covering disc 300, a universal bolt pattern plate 200 having a retaining system for connecting to the covering disc, and a spring biasing base 400 for coupling the bolt pattern plate to the wheel of the vehicle. The wheel cover assembly of the present invention is universal, and is capable of accommodating different styles and patterns of wheels.

The universal bolt or stud pattern plate 200 includes a series of about four (4) to about six (6) positions, sections or regions 220 that can match a variety of bolt patterns and wheel hole patterns of vehicles' wheels. In aspects of the present invention, each section 220 includes a number of engagement means, such as slots 230. In aspects of the present invention, the universal pattern plate 200 may also include a plurality of holes 240 disposed for connection, such as bolted connection, to the outer covering disc 300. The bolt pattern plate 220 may also include a plurality of outer holes 250 disposed closer to the outer perimeter of the bolt pattern plate 200 for connection to lug nut engaging fingers of the spring base, as explained below. In a further aspect of the present invention, the bolt pattern plate 220 also includes clearance holes that can accommodate an air valve of a tire.

Materials such as metallic materials may be used to construct the bolt pattern plate 220. However, a skilled person in the art would recognize that the bolt pattern plate may be constructed from a single material or a combination of materials such as plastic and aluminium.

The spring biasing base 400 comprises of a plurality of spring units 420, such as coil springs, each spring unit 420 comprising of a length of spring wire having a terminal portion 440 and an arm or proximal portion 460 with a substantially transverse opening 450 at its free end. Each spring unit 420 may be used for connecting the spring holder 485 to the threaded rod by a lug nut on the axle hub of the particular vehicle. More specifically, the spring holder 485 is slipped over the threaded rod and secured to the threaded rod by the lug nut. The terminal portions 440 of the spring units 420 can then connect to the spring holder 485 by twisting the terminal end 440 of the spring unit 420. The opening 450 of the spring units 420 being capable of receiving connection means 490 for connecting the spring units 420 of the spring biasing base 400 to the bolt pattern plate 200 through the series of slots 230 on the bolt pattern plate 200. In one aspect, said connection means 490 include, without limitations, eye rods or hooked rods.

The wheel cover or outer covering disc or plate 300 may be defined as a disc having a front side 310 and a back side 312 and a central well 320 dropping from the front side 310 to the back side 312. The back side 312 faces to the bolt pattern plate 200. The well 320 includes an open floor o opening 322, side walls 324 and a ring 323 extending substantially orthogonally from the side walls 324 around the opening 322. A retaining system connects the covering disc 300 to the bolt pattern plate 200. In one aspect the retaining system comprises a series of mounting holes 340 disposed on ring 323 that correspond to the series of holes 240 on the bolt pattern plate 200 for connection, such as bolted connection, of the bolt pattern plate 200 to the outer covering disc 300. However, a skilled person in the art would recognize that other retaining systems may be used for connecting the bolt pattern plate 200 to the covering disc 300. For example the retaining system may comprise of protrusions extending from, for example the covering disc that can be received by openings on the universal bolt pattern plate and secured in place by friction or tabs. The outer covering disc 300 may also include a series of venting means, slits or windows 350 at its periphery 305. The outer covering disc 300 may be sized or shaped to cover the wheel and up to 50% of a side wall of a tire associated with the wheel. The back side 312 of the outer covering disc 300 may include a plurality of supporting means or ribs 380 that extend from the periphery 305 of the outer covering disc 300 to the central well 320. Ribs 380 can provide structural strength to the outer covering disc 300. Ribs 380 may be designed for directing air flow from a plurality of long narrow openings or slits or grooves 350 disposed on the periphery of the covering disc 300 to the center of the outer covering disc 300.

The access cap or cover 500 may be defined as a disc sized to fit within well 320. Well 320 is configured to receive said access cap 500. In aspects of the present invention the access cap 500 fits within well 320 such that the surface of the front side 310 of the outer covering disc 300 and the outer surface of the access cap 500 are substantially flushed. The outer surface of the access cap 500 may include engaging means for connecting to ornaments 510.

In aspects of the present invention, the covering plate 300 together with the access cap 500 may be used as a platform for advertising purposes. The outer covering disc 300 and the access cap 500 may come in a variety of colours. In one aspect of the invention, a user of the present invention may choose a colour or design of the outer covering disc 300 or the access cap 500, for example through the Internet. The user may also create his or her own designs or colours.

Materials such as metallic materials may be used to construct the outer covering disc 300, access cap 500 and ornaments 510. However, a skilled person in the art would recognize that the outer covering disc 300, access cap 500 and ornaments 510 may be constructed from a single material or a combination of materials such as plastic and aluminium.

In one aspect of the present invention, the wheel cover assembly of the present invention allows for increase air flow to a braking mechanism of a vehicle. The venting means 350 of the outer covering disc 300 are in the direct path of the ambient flow of air. The supporting means or ribs 380 on the back side 312 of the outer covering disc 300 functions to give structural strength to the disc 300 and are designed to channel the air flow from the venting means 350 to the center of the outer covering disc 300.

In one aspect, the present invention provides for a removable covering wheel assembly kit, wherein said kit comprises spring units, a bolt pattern plate and an outer covering disc. In aspects of the present invention the kit further comprises nut engaging fingers.

A locking mechanism may also be added to the assembly in order to prevent theft of the assembly. For example, the central well 320 of the outer covering disc 300 may include a series of apertures 360 that serve as a female engaging part for a bar lock.

In operation, the universal assembly is mounted to a wheel. How this is achieved is explained here below. Unlike other wheel covers in the art, for the wheel cover assembly of the present invention to be mounted to the wheel requires the removal of the wheel's lug nuts so that the spring biasing base 400 of the removable wheel cover assembly can be mounted onto the threaded wheel bolts or studs protruding from the axle hub through the wheel.

Wheels come in a variety of different bolt or stud patterns: there are four (4) bolts pattern wheels, five (5) bolt pattern wheels and even six (6) bolt pattern wheels. If, for example, a wheel has a 5 bolt pattern, then 5 coil units 420 will be needed to mount the universal removable wheel cover assembly of the invention.

A lug nut of the wheel is removed and the spring holder 485 is slipped on the threaded stud or rod of the axle hub. The lug nut is replaced making sure the nut is tightened down completely. This process is repeated for all of the remaining lug nuts in the wheel. The terminal ends 440 of the spring units 420 of the spring biasing base 400 are then twisted onto the spring holders 485 and around the lug nuts, thereby securing the spring biasing base 400 to the wheel.

Connection means 490, such as eye/hooked threaded rods, may then be connected onto the spring biasing base 400 by twisting the lead edge of the connection means 490 through the openings 450 in the spring units 420.

The nut engaging fingers 480 may then be assembled to the bolt pattern plate 200. The bolt pattern plate 200 has a number of bolt pattern positions or sections 220 for quick and easy assembly. Slots 230 within these sections 220 will allow for the positioning of the spring/eye hooked rod assembly to match the wheel stud pattern of most current wheels in the market. The nut engaging fingers 480 are placed into the lug nut wells of the wheel and the eye hooked rods 490 are slid into the appropriate slot 230 and tighten down with accompanying nut so that tension is produced onto the spring units 420 of the spring biasing base 400. The connecting means (eye hooks) 490 connect the spring units 420 to the bolt pattern plate 200 thereby drawing the pattern plate 200 down to the wheel. The nut engaging fingers 480 cause the bolt pattern plate 200 to stand off of the wheel while maintaining tension on the spring biasing base 400. The mounting holes 340 of the outer covering disc 300 may then lined up with the holes 240 of the bolt pattern plate 200 and threaded bolts may then be inserted through the mounting holes 340 and the holes 240 thereby securing the outer covering disc to the bolt pattern plate 200.

The mounting on one wheel may then be completed by simply pushing on the access cap 500 into the well 320. An ornament 510 may then be secured to the access cap 500. This process is repeated for all of the wheels in a vehicle.

There is much variance amongst wheels of different vehicles. Accordingly, in one aspect the present invention provides for a universal, removable wheel cover assembly kit comprising nut engaging fingers of about 6" in length to allow for the mounting of the universal wheel cover assembly to a wheels deep within the side wall of a tire, such as the wheels of a pick up vehicle or SUV, as well as to wheels which are generally shallow compared to a pick up or SUV. Accordingly, in order to accommodate the universal wheel cover assembly of the present invention to the wheels of a particular vehicle, the following pre-assembly step may be necessary: (1) Take a lug nut off of the rod of the bolt that fasten the wheel and slip on a spring holder on the rod. Replace the lug nut onto the rod and tighten securely to anchor the spring holder. Repeat for remaining lug nuts.

(2) Assemble the nut engaging fingers to the bolt pattern plate, making sure that the position of the fingers corresponds to the wheels stud pattern of the vehicle.

(3) Mount the bolt pattern plate to the outer covering disc.

(4) Position the nut engaging fingers around the lug nuts.

(5) Measure a distance D from the outer covering disc circumference to the side wall of the outer circumference of the tire. D corresponds to the longitudinal size of the nut engaging finger that needs to be removed from all nut engaging fingers, so that the outer disc will be snug to the side wall of the tire. In one aspect of the invention, D is the distance from the outer covering disc to the side wall of the outer circumference of the tire plus about ⅛" or about 4 mm for spring tension. The nut engaging fingers are disassembled and a longitudinal size D is removed from the nut engaging fingers, for example with the use of a hack saw or other appropriate tool. Once the nut engaging fingers have been shortened, they are set aside for future use.

Other variations and modifications of the instant invention are possible. All such modifications or variations are believed to be within the sphere and scope of the invention as defined by the claims appended hereto.

The invention claimed is:

1. A universal wheel cover assembly mounted to a vehicle's axle by a series of threaded rods and lug nuts, wherein said universal wheel cover assembly comprises:
   (a) a covering disc sized to cover the vehicle's wheel,
   (b) a universal bolt pattern plate having a series of sections, wherein each section has a plurality of engagement means that match a pattern of threaded rods on the vehicle's axle and having a retaining system for connecting the universal bolt pattern plate to the covering disc, and
   (c) a plurality of spring coil units wherein each spring coil unit has a terminal portion, a proximal portion and a spring holder, whereby the spring holder is secured to the threaded rod by the a respective lug nut and the terminal portion is secured to the spring holder and the proximal portion engages the engagement means whereby connecting the universal bolt pattern plate to the vehicle axle and the retaining system connects the universal bolt pattern plate to the covering disc.

2. The universal wheel cover assembly of claim 1 wherein said retaining system comprises a plurality of holes on the universal bolt pattern plate that cooperate with mounting holes on the covering disc for bolted connection between the covering disc and the universal bolt pattern plate.

3. The universal wheel cover assembly of claim 1 wherein said covering disc includes a front side, a back side and a central well extending from the front side to the back side, said central well having an open floor and an inner ring extending around said open floor, and wherein said retaining system connects the bolt pattern plate to the inner ring of the covering disc.

4. The universal wheel cover assembly of claim 3 wherein said back side includes plurality of supporting ribs extending from a periphery of said covering disc to the central well and a plurality of venting means disposed along said periphery of the covering disc, and wherein said supporting ribs are designed for directing air flow from the periphery of the covering disc to a braking system of the vehicle.

5. The universal wheel cover assembly of claim 3 wherein said universal wheel cover assembly further comprises an access cap, and wherein said central well is designed for receiving said access cap.

6. The universal wheel cover assembly of claim 5 wherein said access cap is capable of receiving one or more ornaments.

7. The universal wheel cover assembly of claim 1 wherein said covering disc is sized to cover said vehicle's wheel and up to 50% of a tyre mounted to the vehicle's wheel.

8. The universal wheel cover assembly of claim 1 wherein said covering disc comprises a platform for advertisement purposes.

9. The universal wheel cover assembly of claim 1 wherein said bolt pattern plate includes from about 4 to about 6 sections for matching a vehicle's bolt pattern.

10. The universal wheel cover assembly of claim 1 wherein said plurality of engagement means comprises a plurality of slots capable of retaining the plurality of coil units to the universal bolt pattern plate.

11. The universal wheel cover assembly of claim 1 wherein said plurality of engagement means are capable of alignment to vehicle wheels having a variety of different patterns of holes.

12. The universal wheel cover assembly of claim 1 wherein a spring holder is positioned over the threaded rod and secured by the lug nut and the terminal end of the spring coil unit is positioned into the spring holder.

13. The universal wheel cover assembly of claim 1 wherein said proximal portion includes an opening capable of receiving a connecting means for connecting said coil unit to the engagement means.

14. The universal wheel cover assembly of claim 1 wherein said vehicle is selected from the group consisting of: automobiles, recreation vehicles, and trailers.

15. A universal covering wheel assembly kit, mounted to a vehicle's axle by a series of threaded rods and lug nuts, wherein said universal covering wheel assembly kit comprises:
   (a) a covering disc sized to cover the vehicle's wheel,
   (b) a universal bolt pattern plate, having a series of sections, wherein each section a plurality of engagement means that match a pattern of threaded rods on the vehicle's axle hub and having a retaining system for connecting the universal bolt pattern plate to the covering disc, and
   (c) a plurality of spring coil units wherein each spring coil unit has a terminal portion, a proximal portion and a spring holder, whereby the spring holder is secured to the threaded rod by the a respective lug nut and the terminal portion is secured to the spring holder and the proximal portion engages the engagement means whereby connecting the universal bolt pattern plate to the vehicle axle and the retaining system connects the universal bolt pattern plate to the covering disc.

16. The assembly kit of claim 15 wherein said kit further comprises an access cap.

* * * * *